US010612715B2

(12) United States Patent
McLaughlin (10) Patent No.: US 10,612,715 B2
(45) Date of Patent: Apr. 7, 2020

(54) COUPLING ASSEMBLY AND PROTECTIVE RING THEREFOR

(71) Applicant: NATIONAL OILWELL VARCO, L.P., Houston, TX (US)

(72) Inventor: Thomas Kilpatrick McLaughlin, Aberdeenshire (GB)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 391 days.

(21) Appl. No.: 15/128,949

(22) PCT Filed: Mar. 12, 2015

(86) PCT No.: PCT/GB2015/050728
§ 371 (c)(1),
(2) Date: Sep. 23, 2016

(87) PCT Pub. No.: WO2015/145107
PCT Pub. Date: Oct. 1, 2015

(65) Prior Publication Data
US 2017/0114942 A1 Apr. 27, 2017

(30) Foreign Application Priority Data
Mar. 25, 2014 (GB) .................................. 1405338.3

(51) Int. Cl.
*F16L 58/18* (2006.01)
*F16L 15/00* (2006.01)
(Continued)

(52) U.S. Cl.
CPC .......... *F16L 58/182* (2013.01); *E21B 17/042* (2013.01); *E21B 17/046* (2013.01);
(Continued)

(58) Field of Classification Search
CPC ..... F16L 58/182; F16L 15/001; F16L 15/003; F16L 15/006; F16L 15/008; F16L 15/08; E21B 17/08; E21B 17/042; E21B 17/046
(Continued)

(56) References Cited

U.S. PATENT DOCUMENTS 4,509,776 A * 4/1985 Yoshida ................ F16L 58/182
285/55
5,355,908 A 10/1994 Berger
(Continued)

FOREIGN PATENT DOCUMENTS

JP H01288693 A 11/1989
WO 9943974 A1 9/1999
(Continued)

OTHER PUBLICATIONS

International Search Report dated Jun. 17, 2015 for International Application No. PCT/GB2015/050728 filed Mar. 12, 2015.
(Continued)

*Primary Examiner* — Zachary T Dragicevich
(74) *Attorney, Agent, or Firm* — Conley Rose, P.C.

(57) ABSTRACT

A coupling assembly includes a coupling, a protective ring and two tubulars, the coupling of generally cylindrical shape with a channel therethrough, the coupling having at least one internal thread and two coupling ends and a pin end of at least one of the two tubulars having an external thread for threaded mating therewith so that the coupling assembly provides a connection between the two tubulars, the protective ring including a ring body for positioning adjacent an interior wall of the coupling between the two ends thereof, the ring body being generally cylindrical and having a ring channel therethrough, the protective ring includes one of a tongue and groove and at least one of the ends of at least one of the two tubulars having the other of a tongue and groove.

19 Claims, 8 Drawing Sheets

(51) Int. Cl.
    *E21B 17/08*         (2006.01)
    *E21B 17/042*       (2006.01)
    *E21B 17/046*       (2006.01)

(52) U.S. Cl.
    CPC ............ *E21B 17/08* (2013.01); *F16L 15/003* (2013.01); *F16L 15/001* (2013.01)

(58) Field of Classification Search
    USPC .......................................... 285/55, 333, 334
    See application file for complete search history.

(56) References Cited

U.S. PATENT DOCUMENTS

| | | | |
|---|---|---|---|
| 5,470,111 | A | 11/1995 | Nelson et al. |
| 6,070,912 | A | 6/2000 | Latham |
| 6,073,332 | A | 6/2000 | Turner |
| 6,860,525 | B2 * | 3/2005 | Parks |
| 2009/0167016 | A1 * | 7/2009 | Zapata .................. F16L 58/182 285/55 |
| 2012/0193908 | A1 * | 8/2012 | Mazzaferro ............. F16L 15/08 285/55 |

FOREIGN PATENT DOCUMENTS

| | | | |
|---|---|---|---|
| WO | 2008038034 | A1 | 4/2008 |
| WO | 2009004387 | A2 | 1/2009 |

OTHER PUBLICATIONS

UK IPO Search Report dated Oct. 8, 2014 for British Application No. GB1405338 filed Mar. 25, 2014.

* cited by examiner

PRIOR ART

COUPLING ASSEMBLY AND PROTECTIVE RING THEREFOR

CROSS-REFERENCE TO RELATED APPLICATIONS

This application is a 35 U.S.C. § 371 national stage application of PCT/GB2015/050728 filed Mar. 12, 2015, entitled "Coupling Assembly and Protective Ring Therefor," which claims priority to British application No. 1405338.3 filed Mar. 25, 2014, both of which are incorporated herein by reference in their entirety for all purposes.

BACKGROUND

The present disclosure relates to a coupling assembly, a protective ring for use in the coupling assembly, a tubular used in the coupling assembly, an accessory connection, a string of tubulars and to a method of coupling tubulars together.

Many tubulars are used to convey corrosive or erosive materials in the construction, maintenance, injection and production phases of oil and gas wells. Examples of such tubulars are casing, risers, drill pipe, drill collars, pup joints, production tubing, and pipelines. The tubulars may be rigid, flexible and/or coilable.

Rigid tubulars are generally made from mild steel in sections having upper and lower threaded ends. Each section, known as a joint, is typically between 7.32-13.41 m (24-44 feet) long, although shorter sections are also utilised for certain purposes. This rigid tubular is rigid to the extent that it is self-supporting when racked vertically and when racked horizontally between ends, deflects negligibly under its own weight.

Flexible tubulars, such as flexible risers are made of several concentric layers, including steel helical bands and plastic composite layers. Flexible risers are coiled on to large reels and thus of a long length with few connections when in situ. The connections are generally of the threaded type with proprietary independently rotatable or push-fit or bayonet style collars.

Coiled tubing is generally small diameter (typically less than 3.25 inches, (83 mm)) and made from a mild steel. The connections are generally of the threaded type with proprietary independently rotatable or push-fit collars. Coiled tubing is coilable on to reels.

In certain circumstances, tubulars may transport fluids that are highly corrosive to the mild steel used in the body of the tubular. Such circumstances may be in the drilling for oil and gas in particular types of formation likely to encounter corrosive fluids; in conveying production fluids which may be corrosive; in fracking operations in which corrosive fluids may be used, such as sea water; and in well stimulation operations such as re-injection of oil and gas wells, in which sea water may be used. Injection fluids, production fluids or fluids found in the zones being drilled through may produce highly corrosive fluids which may attack the mild steel tubulars.

To overcome corrosion problems, and as well known to those skilled in the art, such tubulars may be made from chromium alloy instead of mild steel. However, chromium alloy is very expensive and if a surface of the chromium alloy tubular is scratched, corrosion can still occur. Dill pipe may be coated in a corrosion resistant coating. However, such coatings are prone to being chipped and scratched. Drill pipe is generally designed to flex between upper and lower upsets and tend to twist under extreme torsion from being driven by a top drive, rotary table, downhole electric or mud motor and is thus usually coated.

It is also common to use lined mild steel tubulars, with liners made of glass reinforced epoxy, plastic, stainless steel, or other corrosion resistant materials. Such lined steel tubulars may be used for production tubing, pipelines and casing, such as: conductor casing; surface casing; intermediate casing; production casing; liner casing, which is casing that does not extend to a wellhead, but hung from a lower end of a casing string; and tieback casing, which may be used to link the liner casing back to the wellhead. The liners are formed as separate members which may be rigid to the extent that they are self-supporting.

Corrosive fluids may be two-phase or multi-phase fluids, such as sea water, which has dissolved salts and air trapped therein. Sea water and other corrosive fluids are commonly used in re-injection wells. A re-injection well may be an existing well into a reservoir or a specially drilled well into a depleted reservoir. Re-injection fluids are pumped down into the reservoir to stimulate and increase pressure in the reservoir to force any desirable oil out of the reservoir through a producing well.

Corrosive fluids may also be produced oils and gases and thus lined production tubulars and lined pipe lines are often desirable. Such production fluids may be multi-phase fluids containing liquid and gas.

One typical lined tubular is a dual or double walled tubular in which the inner wall is a liner tube made of a corrosion resistant material that serves as a conductor for the corrosive fluid, and an outer wall or pipe that is designed to provide strength to withstand the internal pressures of the corrosive fluid, as well as external forces such as external pressure, mechanical loading, etc., An example of this type of pipe is TK™-lined pipe, sold by National Oilwell Varco L. P. in which a steel walled tubular is lined with a Glass Reinforced Epoxy (GRE) liner. The GRP liner is inserted into a steel walled tubular and cemented to the inside wall of the steel walled tubular. Rigid tubulars are of limited length due to conditions and limitations to which the tubulars are subjected on site, such as storage racks and handling equipment. Thus, in the case of joints of production tubing and casing, each joint is usually about 7.32-13.41 m (24-44 feet) long while the tubing or casing string itself may be hundreds or even thousands of metres long. Accordingly, and as is well known in making up strings of tubulars, such as casing string, successive joints of casing are connected together using a coupling until the desired length of string is achieved. Similarly in pipelines successive pieces of pipe are joined using couplings. Both ends of joints of casing are male and thus use a female, internally threaded coupling to join the two ends. There is a need for a way of reducing the risk of corrosion in the coupling and the threads between the coupling and the pipe ends.

Typically, the coupling comprises an annular body for placement between and to which two tubulars may be connected. The annular body has a thread on its interior surface for receiving a threaded pin end of each of the tubulars. An annular gasket is positioned substantially centrally within and co-axial with the annular body. In use, each tubular comes into abutment with one side of the annular gasket as it is screwed into the annular body. An example of such a coupling assembly is shown in U.S. Pat. No. 5,470, 111.

WO 2009/004387 discloses an apparatus comprising a first tubular having a first tubular end and second tubular having a second tubular end arranged in a coupling with a gap between the first tubular end and the second tubular end wherein a spacer is arranged between the first tubular end and the second tubular end, the spacer comprising a body having an interior surface which is not resilient and having a length, the body comprising a first member and a second member, the first member movable relative to the second member to contract the length of the spacer, and the first and second member fit together with a friction fit.

An accessory box is used on the end of a joint of chromium steel casing, perforate casing, tool or other unlined item, as a connection to a lined casing. The end of the lined casing and thread thus need to be protected against corrosive and erosive fluids.

SUMMARY

It is desirable, where successive joints of the lined or clad pipe are joined to one another by means of a coupling that the interior of the coupling is protected from corrosion. It is desirable, where successive joints of the lined or clad pipe are joined to one another by means of a coupling that the threads of the coupling and threaded ends of the tubulars are protected from corrosion.

The inventor has noted that casings and production tubulars are frequently placed in deviated wells and are thus subjected to slight bends. Thus the coupling assembly is subjected to tensile loads on one side of coupling, whilst the opposing side is subjected to compression loads due to such bends, as well as torque through the string of casing as the well is constructed.

The inventor has also noted that parts of the coupling are subject to manufacturing tolerances and design differences, particularly, but not exclusively, to the distance between ends of the tubulars in the coupling and distance between lands in the coupling on to which the ends of the tubulars abut in certain connections, such as in "premium" connections. The inventor also noted that in prior art protective rings, the pressure of any fluid located between the protective ring and the coupling and the pressure of fluid flowing through the coupling assembly, could not be guaranteed.

According to the present disclosure there is provided a coupling assembly comprising a coupling, a protective ring and two tubulars to be coupled, the coupling of generally cylindrical shape with a flow channel therethrough, the coupling comprising two coupling ends each having an internal thread and an end of each of the two tubulars having an external thread for threaded mating therewith so that the coupling assembly may provide a connection between said two tubulars, the protective ring comprising a ring body for positioning adjacent an interior wall of said coupling between the two ends thereof, said ring body being generally cylindrical and having a ring channel therethrough, characterised in that said protective ring comprises one of a tongue and groove and at least one of the ends of at least one of the two tubulars having the other of a tongue and groove. In use, the tongue is slot into the groove and is slideably disposed in the groove.

The tongue and groove connection between the ends of the tubulars provides a tortuous path for fluids to take between the flow channel of the tubular and the space formed between the outer surface of the protective ring, the internal surface of the coupling, the ends of the tubulars and the ends of the threads. A small quantity of fluid flows along this tortuous path which allows fluid pressure to equalise, but restricts freely flowing fluid next to the mild steel of the ends of the tubulars and the coupling. The corrosive nature of the small amount of corrosive fluid in the space causes negligible corrosion. However, without the protective ring of the disclosure, large quantities of freely flowing corrosive fluids increase corrosion by introducing large quantities of fresh corrosive elements, such as fresh acids, salts and gases continuously replenishing. Thus by reducing freely flowing fluid next to the steel, risk of corrosion is reduced.

Thus, in the present disclosure part of the protective ring is held by a means located in the end of the tubular. In the prior art, the protective rings were simply sandwiched between ends of the tubulars. Thus, in the present disclosure parts of the protective ring pass completely over the gap between the ends of the tubulars and into the ends of the tubulars, thus the protective ring is not reliant on being compressed between the ends of the tubulars. During use, the casing can be subjected to large changes in temperature. For example, temperatures in the well can reach 350 degrees Celsius and for example, during re-injection of cold sea water, the casing is cooled to 10 degrees Celsius or lower. This change in temperature causes the casings to expand and contract, which may move the ends of the tubulars closer together and further apart. Such cyclical movement can damage protective rings and/or allow fresh corrosive fluids to contact the coupling. Corrosion of the tubular will alter its dimensions. Such a corrosion may be slow and take years to occur, but may nonetheless alter the dimensions sufficiently to render the prior art protective rings defunct. The present disclosure does not rely on compressive forces to hold the protective ring in place and allows for such movement, whether induced by temperature movement, corrosion or by bending in deviated wells.

In some embodiments, the groove in a coupling of the present disclosure is a cylindrical groove concentric with the coupling. The cylindrical groove may be substantially continuous. In some embodiments, the tongue is a cylindrical tongue concentric with the coupling. In some embodiments, the cylindrical tongue is substantially continuous. The cylindrical groove may comprise a plurality of pockets and the cylindrical tongue comprises notches to form a castellation, each notch to be received by each pocket.

The tongue may be located on a side of the ring body and in some embodiments, the other of the two tubulars also have an external thread and further comprise a further tongue on an opposing side of the ring body and a further groove in the other of the two tubulars. The protective ring is thus symmetrical and can be inserted either way up before or during coupling. Furthermore, its symmetry facilitates the protective ring to assume a central position between the two grooves, which facilitates the protective ring remaining in place and effective whilst bending of the tubular and connection, such as when lowered through a deviated well.

In some embodiments, the groove is arranged in a ring flange in the pin end of the tubular. In some embodiments, the ring flange has an outer surface glued or provided with an interference fit within the steel body of the pin end of the tubular and the ring flange may have an inner surface glued or provided with an interference fit with the liner.

The two tubulars may be lined with a liner and in some embodiments, the liner is a preformed liner which may be rigid and is slid into the tubular and bonded thereto. The bonding may be made with a cement based mortar. In some embodiments, the liner is made from a Glass Reinforced Epoxy, although may be made from a steel alloy, such as a chromium alloy, or other metal or composite corrosion resistant material.

In some embodiments, an annulus is provided between at least part of the protective ring and the coupling. The annulus may be provided between the tongue and the body of the protective ring and is also defined by the end flange and an interior wall of the coupling.

A gap may be provided about the tongue in the groove to allow a small quantity of fluid to pass therethrough. The gap is small, in that only a small flow rate of fluid is allowed to pass therethrough. This fluid pass typically ceases once pressure is equalised.

In some embodiments, the ring body comprises at least one shoulder to provide a piston surface in the annulus.

The ring body may comprise at least one further shoulder to provide a further piston surface in the annulus, the further shoulder opposing the at least one shoulder. In some embodiments, in use fluid pressure in the annulus acts on the shoulder and opposing further shoulder to centre the protective ring between pin ends of the tubulars.

The ring body may have an outer wall and a recess therein receiving a ring barrier. In some embodiments, the ring barrier is an O-ring that may seal between the ring body and the coupling and in some embodiments, partially seals allowing a small amount of fluid pressure to pass slowly. The ring barrier may serve to split the annulus into two annuli, each part being supplied with fluid and fluid pressure through respective tortuous paths between tongues and grooves. As the pressure equalizes between the two annuli, the force on the opposing shoulders will induce the protective ring to move into a substantially central position between ends of the two tubulars.

In some embodiments, the tongue has a tip with a corrosion barrier thereon. In some embodiments, the corrosion barrier is a resilient member, such as an elastomeric ring or PTFE ring. In some embodiments, the corrosion barrier is of a non-uniform cross-section, such as tear shaped or oval. In some embodiments, the long axis of the tear shape or oval is substantially parallel with the axis of the coupling. This may facilitate the tongue being stabbed into the groove. The corrosion barrier may deform to allow a small seepage of fluid thereby. An elastomeric ring having 50 to 90 Durometer hardness would be suitable.

The other of the two tubulars may be integral with the coupling. Such a coupling may be referred to as an accessory box.

The present disclosure also provides a protective ring for use in a coupling assembly of the disclosure. The protective ring comprises a ring body and one of a tongue and groove for receiving the other of the tongue and groove of the end of the at least one of the two tubulars.

The present disclosure also provides a method of installing a protective ring in a joint of casing, the method comprising the steps of spinning and torqueing a threaded coupling on to a threaded pin end of a tubular at a distance from the drilling rig, placing a protective ring of the disclosure within the coupling and locating the tongue into the groove to obtain a prepared tubular and subsequently moving the prepared tubular to a rack of a drilling rig. In some embodiments, the term "at a distance" means not on the drilling rig floor, advantageously, in a workshop, and/or making up whilst the coupling and tubular lie horizontally.

The present disclosure also provides an accessory assembly comprising an accessory box integral with a tube, a protective ring and a lined tubular, the accessory box of generally cylindrical shape with a channel therethrough, the accessory box having at least one internal thread and a pin end of the lined tubular having an external thread for threaded mating therewith so that the accessory box provides a connection between the lined tubular and the tube, the protective ring comprising a ring body for positioning adjacent an interior wall of the accessory box, the ring body being generally cylindrical and having a ring channel therethrough, wherein the protective ring comprises one of a tongue and groove and the pin end of the lined tubular having the other of a tongue and groove. In some embodiments, the tube is any one of: a perforate tubular; a downhole tool; an un-lined casing; a chromium steel casing; a stub on to which liner casing may be hung.

BRIEF DESCRIPTION OF THE DRAWINGS

For a better understanding of the present disclosure reference will now be made, by way of example only, to the accompanying drawings, in which.

DETAILED DESCRIPTION

Figure 1:
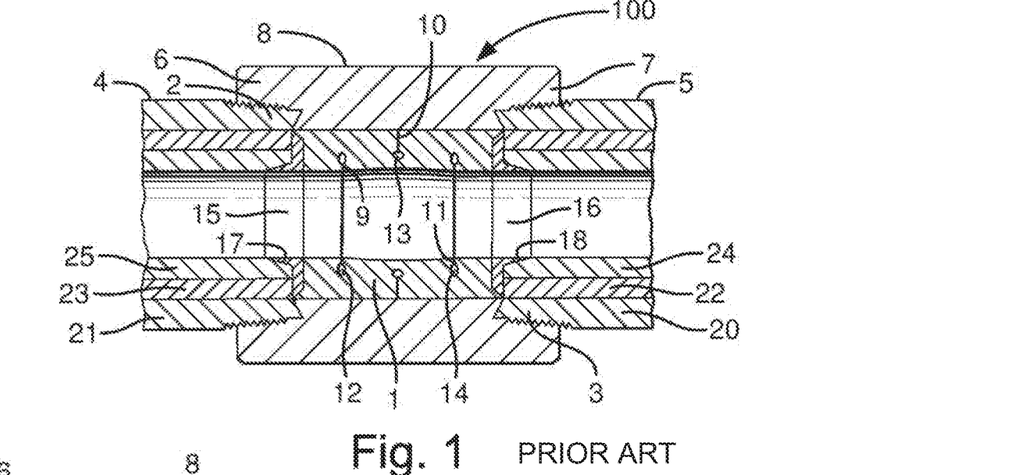
FIG. 1 is a side cross-sectional view of a prior art coupling assembly comprising a coupling, two ends of joints of casing and a protective ring therebetween.
Figures 2, 3:
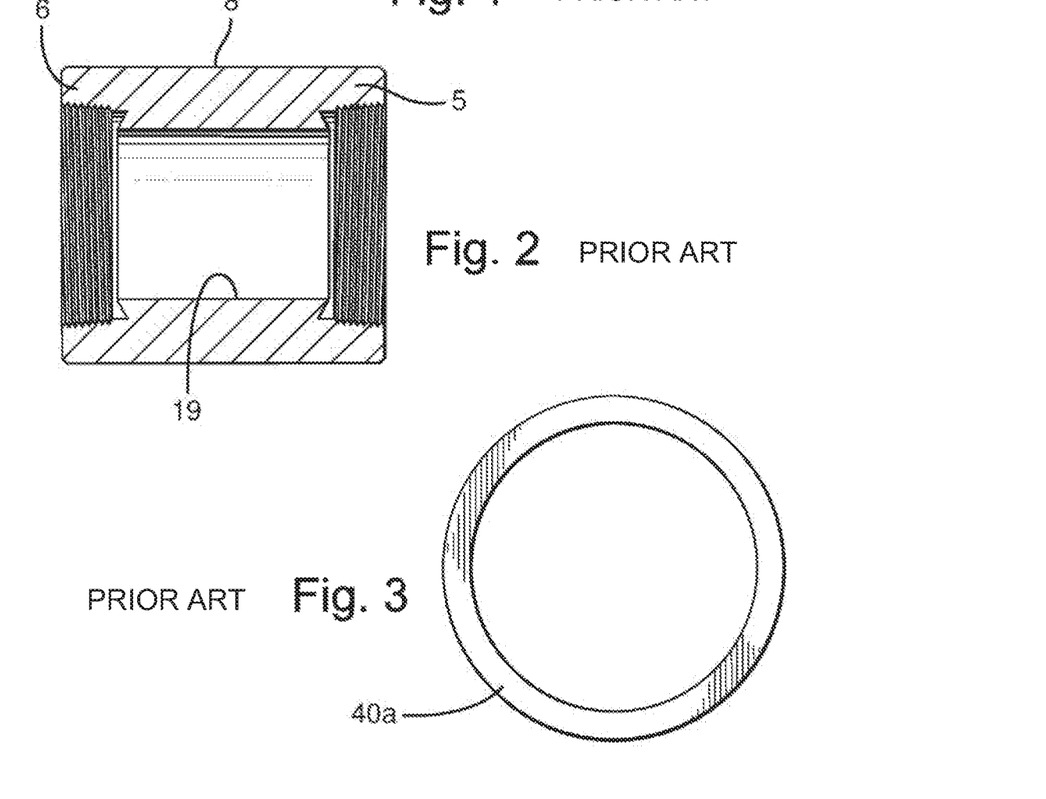
FIG. 2 is a side cross-sectional view of the coupling.
FIG. 3 is an end view of the protective ring shown in FIG. 1.
Figure 4:
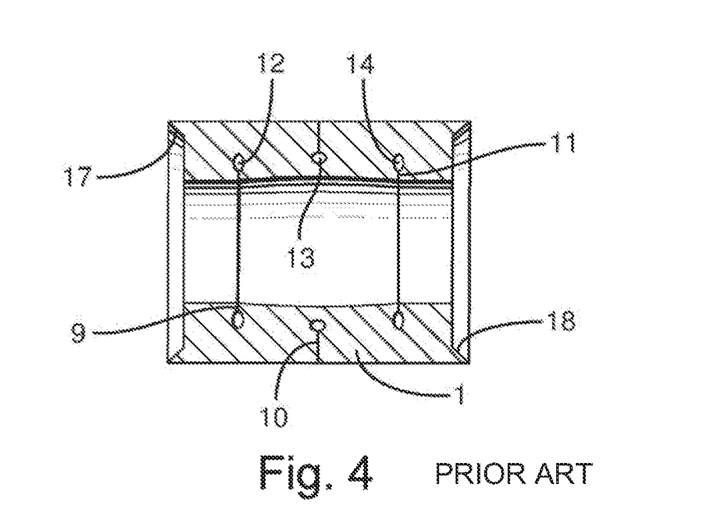
FIG. 4 is a side view of the protective ring shown in FIG. 1.

Referring to FIG. 1, there is shown a prior art coupling assembly 100 of the type shown in PCT Patent Publication No. WO 2008/038034. A protective ring 1 is held in compression between pin ends 2, 3 of respective joints of casing 4, 5. Each pin end 2, 3 is threadedly secured in a respective end 6, 7 of a coupling 8. The protective ring 1 has three spaced-apart openings 9, 10, and 11, each containing an energizing member 12, 13, 14, respectively. The protective ring 1 is shown in FIG. 4 removed from the coupling 8. The coupling 8 is also shown alone in FIG. 2.

Figure 5:
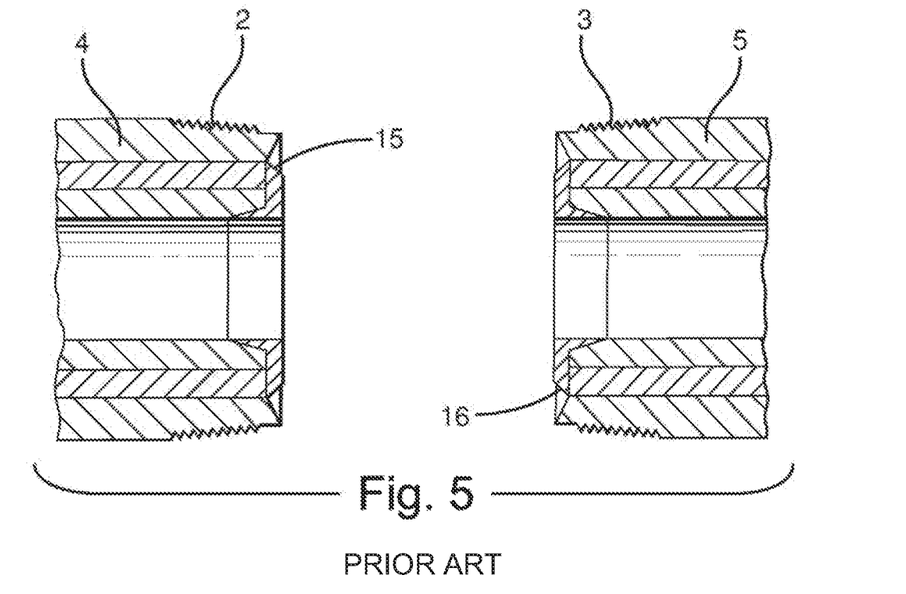
FIG. 5 is a side view of the two ends of joints of casing shown in FIG. 1.

Pin ends 2, 3 of the casings 4, 5 are shown in FIG. 5 removed from the coupling 8. Each pin end 2, 3 has an outer end bevel or taper 15, 16, respectively. Corresponding edge portions 17, 18 of the protective ring 1 are sized to sit between an interior wall 19 of the coupling 8 and the bevelled pin ends, thus assisting in securing the protective ring 1 in place adjacent the interior wall 19 of the coupling 8.

In the coupling assembly 100, the protective ring 1 extends around the entire inner circumference of the coupling 8 and the energizing members 12, 13, and 14 extend as rings around and within the entire circumference of the protective ring 1.

Each joint of casing 4, 5 comprises an outer steel cylindrical body 20 and 21 lined with respective linings 24, 25 cemented in the steel cylindrical body 20 and 21 with an annular sleeve of cement 22 and 23.

This type of protective ring 1 is suitable for liquid fluids and some two-phase fluids (gas and liquid), but not so for single phase gases nor two-phase fluids with a significant proportion of gas, as it cannot be guaranteed that pressure will always equalize between gas caught gas between protective ring 1 and the coupling 8 and the pressure of the gas conveyed through the tubulars and the coupling assembly 100.

Figure 6:
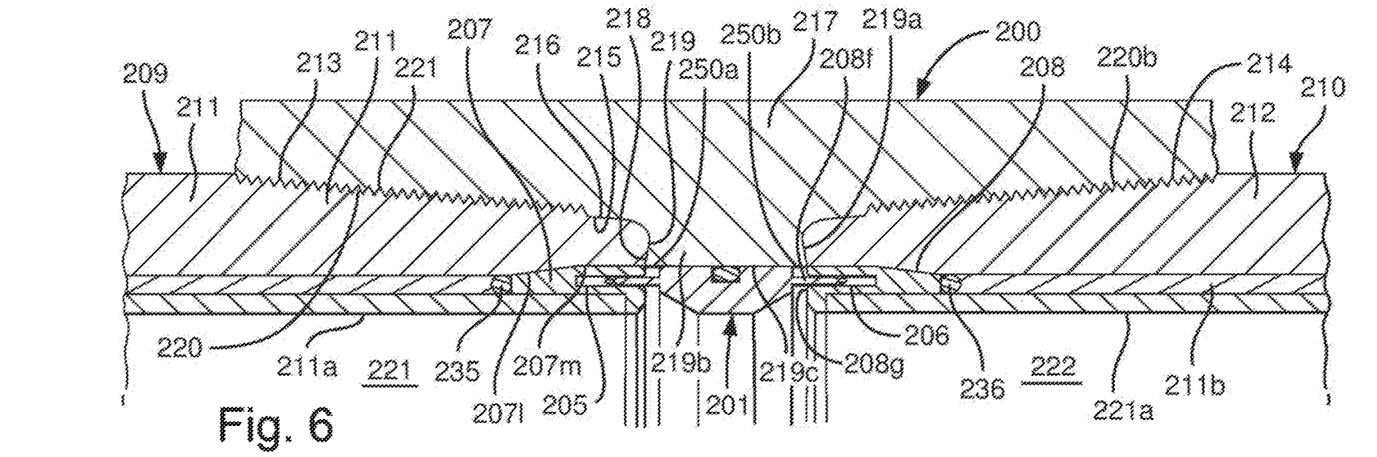
FIG. 6 is a side cross-sectional view of a coupling assembly in accordance with the present disclosure comprising two ends of joints of casing in accordance with the present disclosure and a protective ring in accordance with the present disclosure.
Figure 7:
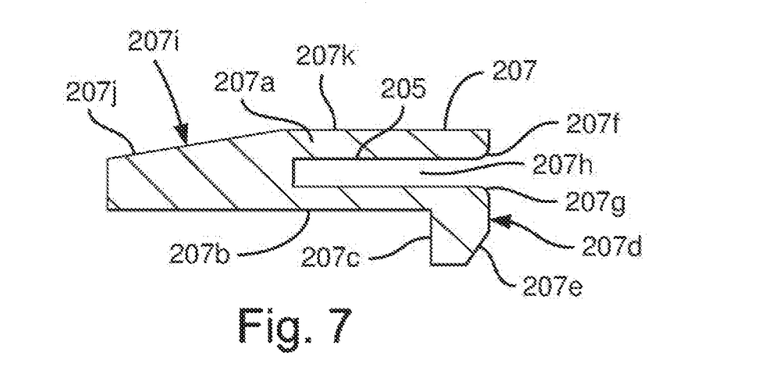
FIG. 7 is an enlarged side cross-sectional view of a part of an end of one of the joints of casing shown in FIG. 6.
Figure 8:
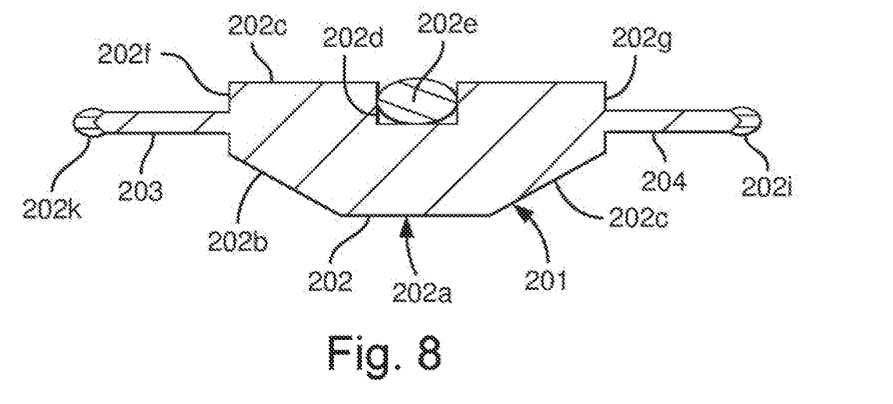
FIG. 8 is an enlarged side cross-sectional view of a part of the protective ring shown in FIG. 6.

Referring to FIGS. 6, 7 and 8, there is shown a coupling assembly 200 in accordance with the present disclosure with a "premium" type connection. The coupling assembly 200 comprises a protective ring 201 having a ring body 202 and a cylindrical tongue 203 and 204 on either side thereof. The ring body 202 and cylindrical tongues 203 and 204 are moulded as a single piece structure from a Glass Reinforced Epoxy having a matrix of short glass fibres. An end portion of each tongue 203 and 204 is located in a corresponding cylindrical groove 205 and 206 of respective ring flanges 207 and 208.

Each ring flange 207 and 208 is located at the end of each joint of casing 209 and 210. Each joint of casing 209 and 210 comprises a cylindrical steel body 211 and 212 having an external threaded and tapered pin end 213 and 214. It should be noted that the pin ends 213 and 214 are tapered in this embodiment, but they need not be tapered.

The joint of casing 209 and 210 may have an outer diameter which is substantially equal along its length, as shown in FIG. 6 with tapered pin ends 213, 214. The cylindrical steel body 211 is lined with a liner 211*a*, is made from a Glass Reinforced Epoxy, although may be made from other composite material, corrosive resistant steel or other alloy or the like. The liner 211*a* is cemented in place with a layer of mortar 211*b*, such as a modified Portland cement based mortar. Typically, the layer of mortar is 1 to 2 mm thick. During application of the liner 211 in the casing 209, 210, the liner is slid into the bore of the casing 209, 210 and mortar is injected therebetween. A protective O-ring 235, 236 is installed in at the end of the pin ends 211, 212 to push back the mortar 211*b* to create a space for the ring flange 207 and 208 to be installed into. The protective O-rings 235, 236 typically have a hardness of 70 to 90 Durometer.

Referring to FIG. 7, each end flange 207 and 208 is made from a Glass Reinforced Epoxy having a matrix of short glass fibres, although may be made from other corrosive resistant materials. Each ring flange 207 and 208 is moulded in as a single piece structure. Each ring flange 207 and 208 is a continuous ring. Each ring flange 207 and 208 has a body 207*a* having a plane cylindrical inner surface 207*b* which abuts the liner 211*a*, with a flanged portion 207*c* projecting from the body 207*a* a distance equal to the thickness of the liner 211*a* and abuts the liner 211*a* to protect the end of the liner 211*a*. If the liner 211*a* is made from a material containing fibres, the end flange is particularly important to protect the line ends, such as during a physical impact with another object, torque from the ring interface or fluid ingress from fluid pressure the bore 222, such as when production fluids or injection fluids are flowing therethrough. An end of the flange 207 and 208 forms a nose 207*d* having a frusto-conical chamfer 207*e* on an interior corner. The nose 207*d* has rounded edges 207*f* and 207*g* defining a groove mouth 207*h* leading into groove 205. In some embodiments, the groove 205 is between 12 and 15 mm deep and has an opening height of between 1 and 2 mm and, in some embodiments, 1.5 mm. The rounded edges 207*f* and 207*g* facilitate insertion of the cylindrical tongues 203 and 204, during assembly of the coupling assembly 200. An exterior surface 207*i* of the flange 207 comprises a frusto-conical portion 207*j* and a plane cylindrical portion 207*k* to match corresponding profile of the steel body 211 frusto-conical surface 207*l* and cylindrical surface 207*m*. Surfaces 207*l* and 207*m* are machined in accordance with the thread type and standard of casing, although may be further milled to accommodate the end flange 207. Frusto-conical surface 207*l* is usually in the order of 2 to 5 degrees from the cylindrical surface 207*m*, although may be at a different angle. The ring flanges 207 and 208 are adhered with an epoxy glue on to the corresponding surfaces 207*l* and 207*m* of the steel body 211 and the interior surface 207*b* of the flange 207 and 208 to the liner 211*a*.

In a "premium" connection, as shown, the pin end 213 and 214 are each provided with a pin end sealing surface 215, which may lie in a plane with the thread or at a gentle angle thereto, such as between two and seven degrees and more typically five degrees. A corresponding coupling sealing surface 216 on coupling 217 is also provided. A pin end shoulder 218 lies in a plane at an acute angle to the cylindrical plane of the coupling sealing surface 216, which angle may be between sixty and eighty-nine and degrees and, in some embodiments, eighty degrees thereto, such that the pin end shoulder 218 is sloped towards the cylindrical plane of the coupling sealing surface 216. A corresponding coupling shoulder 219 on the coupling is also provided on central end stop 219*b*. The central end stop 219*b* defines inner cylindrical surface 219*c* of the coupling 217. The distance between coupling shoulder 219 and coupling shoulder 219*a* may vary from coupling to coupling, either from manufacturing tolerance (typical manufacturing tolerance may be 3 mm) or design differences (typically from 15 mm to 75 mm).

The body 202 of the protective ring 201 has an internal plane cylindrical surface 202*a* with a frusto-conical chamfer 202*b* and 202*c* at either inner corner to inter alia reduce eddy currents forming or increase the chance of turbulent, non-laminar flow in the fluid passing through the coupling assembly 200 and reduce the chance of a tool (not shown) passing through the casing from disturbing the protective ring 201. The internal plane cylindrical surface 202*a* may be in the same plane as the internal face of the liner 211*a* but may be slightly set back therefrom and thus have a slightly larger internal diameter. The body 202 has an external surface 202*c* with a recess, such as a circumferential rectangular section groove 202*d* with a ring barrier, such as a floating O-ring member 202*e* therein, such as an elastomeric or PTFE ring. The floating O-ring member 202*e* may or may not provide a fluid tight seal between the external face 202*c* of the protective ring 201 and the inner cylindrical surface 219*c* of the coupling 217. The cylindrical tongues 203 and 204 extend from shoulders 202*f* and 202*g* respectively and are sized to slide smoothly within cylindrical grooves 205 and 206 and allow fluid to flow therebetween. The tongues 203 and 204 may be between 7 and 10 mm long and between 1 and 2 mm, and in some embodiments, 1.4 mm in thickness.

A corrosion barrier 202*i* and 202*k*, such as an resilient ring having a non-uniform cross-section is located and adhered to the end of each tongue 203 and 204 to provide centring and smooth sliding action between the cylindrical tongue 203 and 204 and the cylindrical groove 205 and 206. It should be noted that the corrosion barrier 202*i* and 202*k* is made from a resilient material such as an elastomer, which allows a small amount of fluid to seep thereabout through the groove 205 and 206 between bore 222 of the coupling assembly 200 and an annulus formed between the external surface 202*c* of the protective ring 201 and the inner cylindrical surface 219*c* of the coupling 217. The shoulders 202*f* and 202*g* are of identical surface area. The corrosion barrier 202*i* and 202*k* may be of a tear drop or oval cross-section having a long axis in line with the main axis of the casing and coupling. The hardness of the corrosion barrier may be 70 to 90 Durometer. The corrosion barrier 202*i* and 202*k* is bonded to the end of respective tongue 203 and 204. The end of each tongue has a pointed end, thus increasing the available area for bonding the corrosion barrier 202*i* and 202*k* thereto.

Figure 10:
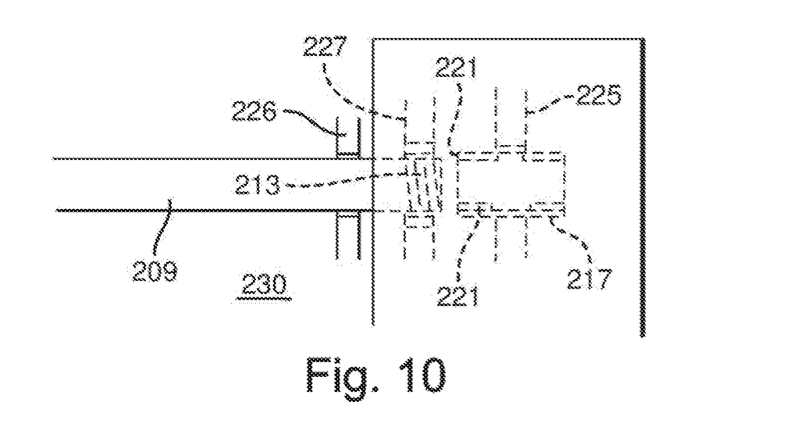
FIG. 10 is a schematic view of a connection apparatus for connecting a tubular to a coupling in a workshop.

In use, typically the joint of casing 209 is made up into the coupling 217 when lying horizontally in a workshop 230, as shown in FIG. 10. The external thread 220 of pin end 213 is offered up into a mouth 221 of the coupling 217. The coupling 217 may be held by a torque resistor, such as a back-up tong 225. The joint of casing 209 is spun to threadedly engage the threaded pin end 213 with internal thread 221 of the coupling. Spinning may be carried out with a spinner 226. A tong 227 may then be applied to the wall of the casing 209 and used to torque the threaded connection between the joint of casing 209 and the coupling 217. The pin end sealing surface 215 slides along coupling sealing surface 216 as the threaded connection is spun and torqued and comes to rest together to provide a metal-to-metal seal to inhibit leakage of liquids and/or gases through the threaded connection. Upon the threaded connection being torqued correctly, the pin end shoulder 218 is pushed against and travels outwards along the coupling shoulder 219 to ensure a metal-to-metal seal between pin end sealing surface 215 and coupling sealing surface 216 to inhibit leakage of liquids and/or gases through the threaded connection. There may or may not be a seal formed between the pin end shoulder 218 and the coupling shoulder 219.

The protective ring 201 may now be placed into the coupling 201 whilst in the workshop 230, whereupon the cylindrical tongue 203 is slid into the cylindrical groove 205, the corrosion barrier 202*k* guiding the tongue 203 over rounded edges 207*f* and 207*g* of the mouth 207*h*. The floating O-ring member 202*e* sits against the internal surface 219*b* of the coupling, which helps hold the protective ring 201 in place. The prepared joint of casing 231 comprising joint of casing 209, coupling 217 and protective ring 201 installed is now conveyed on to a drilling rig 101.

Figure 11:
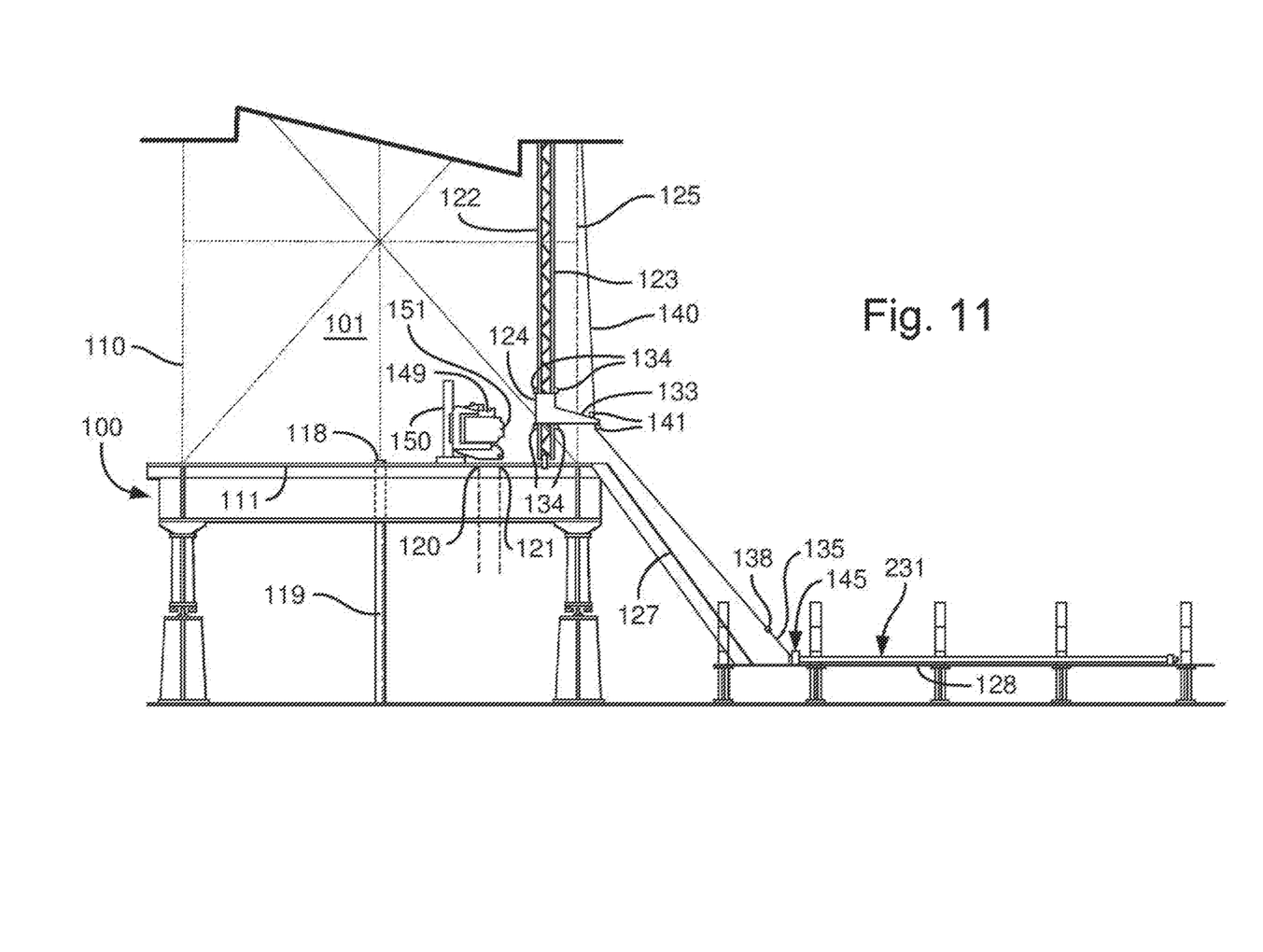
FIG. 11 is a schematic side view of a drilling rig.
Figure 12:
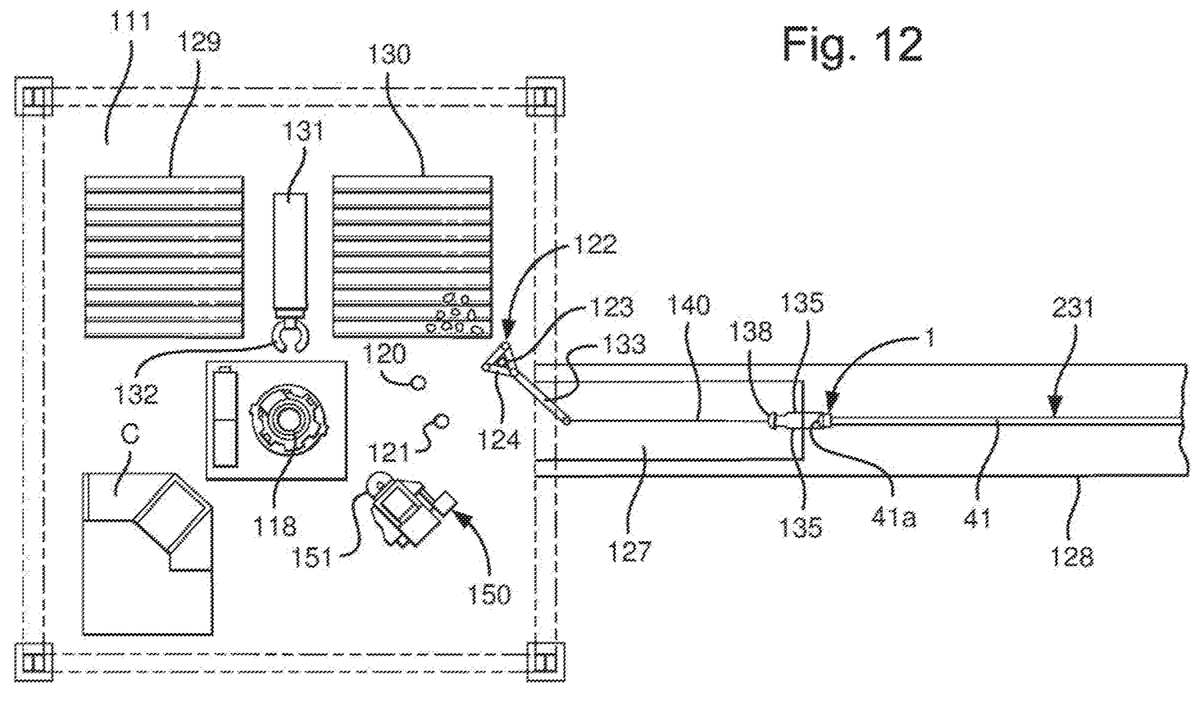
FIG. 12 is a schematic top plan view of the drilling rig shown in FIG. 11.

FIGS. 11 and 12 show schematically the drilling rig generally identified by reference numeral 101. The drilling rig 101 comprises a derrick 110 extending upwards from a drill floor or platform area 111. A drilling hoist comprising a travelling block and a swivel and hook assembly is mounted at the upper part of the derrick, but is not shown in the drawings for clarity. A top drive unit, is mounted on a carriage so as to be displaced along a vertically extending track, is suspended by the hoist in a manner known per se, which are not shown in the drawings for clarity. The drilling hoist and the top drive unit suspended thereby are substantially aligned with a drilling opening 118, known as the wellcentre, defined in the drill floor 111, and the top drive unit may be brought into rotary driving engagement with the upper end of a casing string 119 extending through the drilling opening 118. Alternatively or additionally, a Kelly drive may be used.

Two assembling or preparation openings 120 and 121, known as a mousehole and a rathole respectively, are defined in the drill floor 111 located in close proximity to the drilling opening 118. A pipe handling apparatus for loading casing and drill pipe is generally identified by reference numeral 122. The pipe handling apparatus 122 comprises a vertically extending frame tower 123 and a slideable carriage 124, which may be referred to as a dolly, to which is arranged an elevator 1, such as the elevator 1 described above. The pipe handling apparatus is provided in close proximity to the mousehole 120 and rathole 121 and an opening in the side of the derrick 110 known as a V-door 125 facilitates access to areas off the drill floor 111, including access to an access ramp 127, known as a slide, and an area for storing pipes and an access way for use in transferring the pipes from the storage areas to the platform 111, known as a catwalk 128.

The drill floor 111 may further comprise pipe racks 129 and 130 arranged in setback areas within the confines of the derrick for storing drill pipe stands or well casing or bottom hole assembly parts in a vertical position, such storage areas are conventional fingerboards. A pipe handling arm 131 for loading and unloading stands of pipe from the storage areas 129 and 130 comprising a rotatable and extendable gripping device 132 may be mounted generally in the setback area between the two storage areas and advantageously in the upper portion of the derrick and within the structure of the derrick 110 to provide for moving stands of pipe or sections of pipe between the wellcentre, stand building mouseholes 120 and 121 and/or storage area 129 and 130. The pipe handling arm 131 is a robotic arm which can manipulate pipe at least two planes: vertical and horizontal, and in some embodiments, a third plane and has a knuckle joint at a point close to the gripping device 132 for facilitating maintenance of the pipe in a vertical position, and but may be used to angle the pipe. The knuckle joint is able to orient the pipe in roll and pitch and, in some embodiments, heave. Thus in some embodiments, the arm can manipulate a pipe in all six degrees of freedom.

The prepared joint of casing 231 is moved into and placed vertically in a storage rack 129 or 130 of the drilling rig 101, with the coupling 217 at the top. The joint of casing 210 is similarly made up with a coupling (not shown) and racked in a similar fashion. The prepared joint of casing 231 is then moved into a spider at wellcentre 118, mousehole 120 or rathole 121. The joint of casing 210 is then moved over wellcentre so that the pin end 214 hangs over the mouth 222 of coupling 217. The joint of casing 210 is lowered, whereupon the tongue 204 is guided by rounded edges 208*f* and 208*g* into groove 206 and the external thread 220*a* of the pin end 214 engages the internal thread of the coupling 217. A spinner 149 of an iron roughneck 150 then spins the joint of casing 210 to thread the joint of casing into the coupling 217. A tong 151 of the iron roughneck 150 is then used to torque the connection.

As an alternative, it is envisaged that the protective ring 201 is inserted into the groove 205 of joint of casing 209 on the drilling rig whilst running casing, rather than in the workshop 230. In this case, the joint of casing is spun and torqued to the top of a string of casing in the wellbore to form a lengthened string of casing, the lengthened string of casing is then lowered into the wellbore so that the top of the casing and attached coupling sits in the spider of the drilling rig at height whereupon a rig hand can insert the protective ring 201 into the groove 205 of the joint of casing form the top end of the lengthened string of casing. A subsequent joint of casing is then spun and torqued to the top of the lengthened string of casing.

As the casing string 119 is lowered into the well and subsequently when fluid flows through the string of casing, fluid (either liquid or gas or a combination of the two) flows through a tortuous path formed between the inside of the coupling assembly 200, between the groove 205 and 206 and tongues 203 and 204, past the flexible corrosive barrier 202i and into an annulus 250 formed between the protective barrier 201, the coupling 217 and the ends of the joints of casing 209 and 210. The floating O-ring member 202e inhibits fluid flow thereacross, thus the annulus 250 is, at least initially, separated into a lower and upper annulus. As the pressure equalises across the two annulus 250a and 250b and due to the shoulders 202f and 202g of equal surface area, the protective ring 201 centres itself with between the ends of the ring flanges 209 and 210. Once the annulus 250 is full of fluid, the tortuous path inhibits a fast change of fluid in the annulus. Once the small quantity of fluid in the annulus has corroded the coupling a little, the fluid is no longer corrosive to the coupling assembly. However, because a little fluid can still pass between the annulus and the interior of the string of casing, any pressure difference is quickly equalised.

Pressure equalization is particularly important when running tubulars, such as casing into wellbores, whereupon pressure can change quickly. Furthermore, pressure equalization is particularly important when tripping the string of casing out of the wellbore. Furthermore pressure changes can change significantly in the fluid in the wellbore, for example, when a mud motor is used or communication waves are used to communicate with downhole tools or measuring devices.

Figure 9:
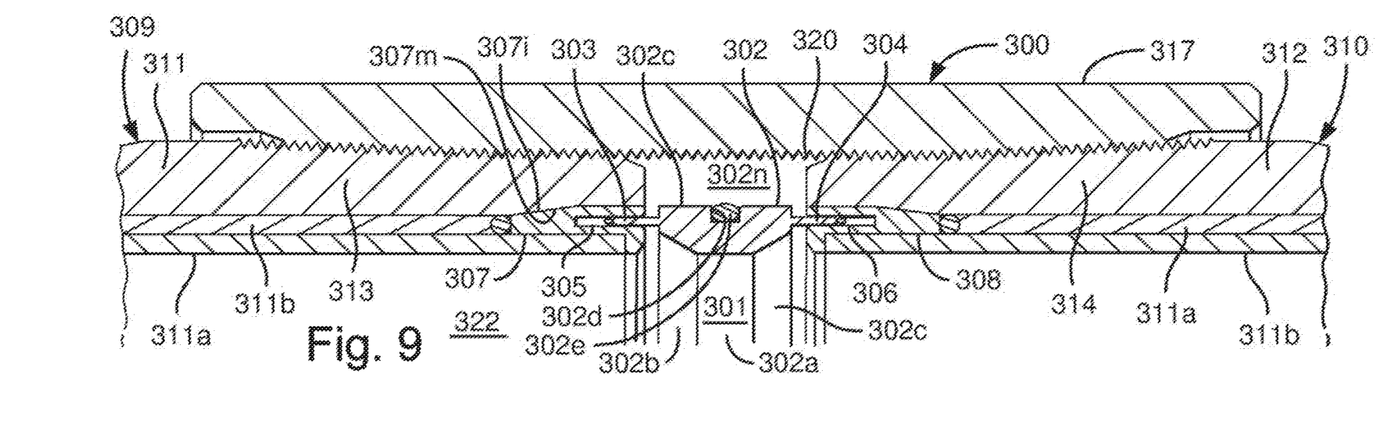
FIG. 9 is a side view cross-sectional view of a coupling assembly in accordance with the present disclosure comprising two ends of joints of casing in accordance with the present disclosure and a protective ring in accordance with the present disclosure.

Referring to FIG. 9, there is shown a coupling assembly 300 in accordance with the present disclosure, the coupling assembly having an "API" connection type. The coupling assembly 300 has no separate sealing surfaces; sealing the connection is achieved by using a helical wedge thread 301 and a dope (not shown) applied to the thread during connection, such that a fluid tight seal is achieved along the thread. The coupling assembly 300 comprises a coupling 317, ends of joints of casing 309 and 310 and a protective ring 301 having a ring body 302 and a cylindrical tongue 303 and 304 on either side thereof. The ring body 302 and cylindrical tongues 303 and 304 are moulded from as a single piece structure from a Glass Reinforced Epoxy having a matrix of short glass fibres. An end portion of each tongue 303 and 304 is located in a corresponding cylindrical groove 305 and 306 of respective ring flanges 307 and 308.

Each ring flange 307 and 308 is located at the end of each joint of casing 309 and 310. Each joint of casing 309 and 310 comprises a cylindrical steel body 311 and 312 having an external threaded and tapered pin end 313 and 314.

Each joint of casing 309 and 310 may have an outer diameter which is substantially equal along its length, as shown in FIG. 6 with tapered pin ends 313, 314. The cylindrical steel body 311 is lined with a liner 311a, which may be made from a Glass Reinforced Epoxy or other composite material, corrosive resistant steel or other alloy or the like. The liner 311a is cemented in place with a layer of mortar 311b, such as a modified Portland cement based mortar. Typically, the layer of mortar is 1 to 2 mm thick.

Each end flange 307 and 308 is generally the same as the end flange 201 and may be identical. However, an exterior surface 307i of the flange 307 match corresponding profile 307m of the steel body 311. The profile 307m may be the same as or different from the profile shown in FIG. 6.

The protective ring 301 is generally the same as the protective ring 201 and may be identical. The body 302 of the protective ring 301 has an internal plane cylindrical surface 302a with a frusto-conical chamfer 302b and 302c at either inner corner to reduce eddy currents forming in the fluid passing through the coupling assembly 300 and reduce the chance of a tool (not shown) passing through the casing from disturbing the protective ring 301. The internal plane cylindrical surface 302a may be in the same plane as the internal face of the liner 311a but may be slightly set back therefrom and thus have a slightly larger internal diameter. The body 302 has an external surface 302c with a recess, such as a circumferential rectangular section groove 302d with a ring barrier, such as a floating O-ring member 302e therein, such as an elastomeric or PTFE ring. However, the O-ring 302e is optional, as is the corresponding groove 302d and thus the external surface 302c may be planar and continuous. An annulus 302n is defined by the external surface 302c and tongues 303 and 304 of the protective ring 301, ends of the joints of casing 309 and 310 and threads 320 of the coupling 317. The cylindrical tongues 303 and 304 extend from shoulders 302f and 302g respectively and are sized to slide smoothly within cylindrical grooves 305 and 306 and allow fluid to flow therebetween. The tongues 303 and 304 may be between 7 and 10 mm long and between 1 and 2 mm, and in some embodiments, 1.4 mm in thickness.

In use, typically the tubular 309 is made up into the coupling 317 when lying horizontally in a workshop 330, in the same way as shown in FIG. 10, save for dope being applied to the threads and then torqued to a pre-determined torque. The prepared joint of casing is then moved to a rack of a drilling rig, as described with reference to FIGS. 11 and 12. As the string of tubulars is lowered into the well, fluid will pass from the bore 322 through the tortuous path defined by the tongues 303 and 304 and grooves 305 and 306 into annulus 302n. Pressure will thus equalise. Once the casing is at the desired depth, pressure will remain reasonably constant and thus due to the tortuous route, fluid will pass into and from the annulus at a very slow rate, thus reducing the risk of corrosion in the coupling 317. Even when pressure does change in the bore 322 fairly quickly, pressure in the annulus 302n will equalise rapidly.

Figure 13:
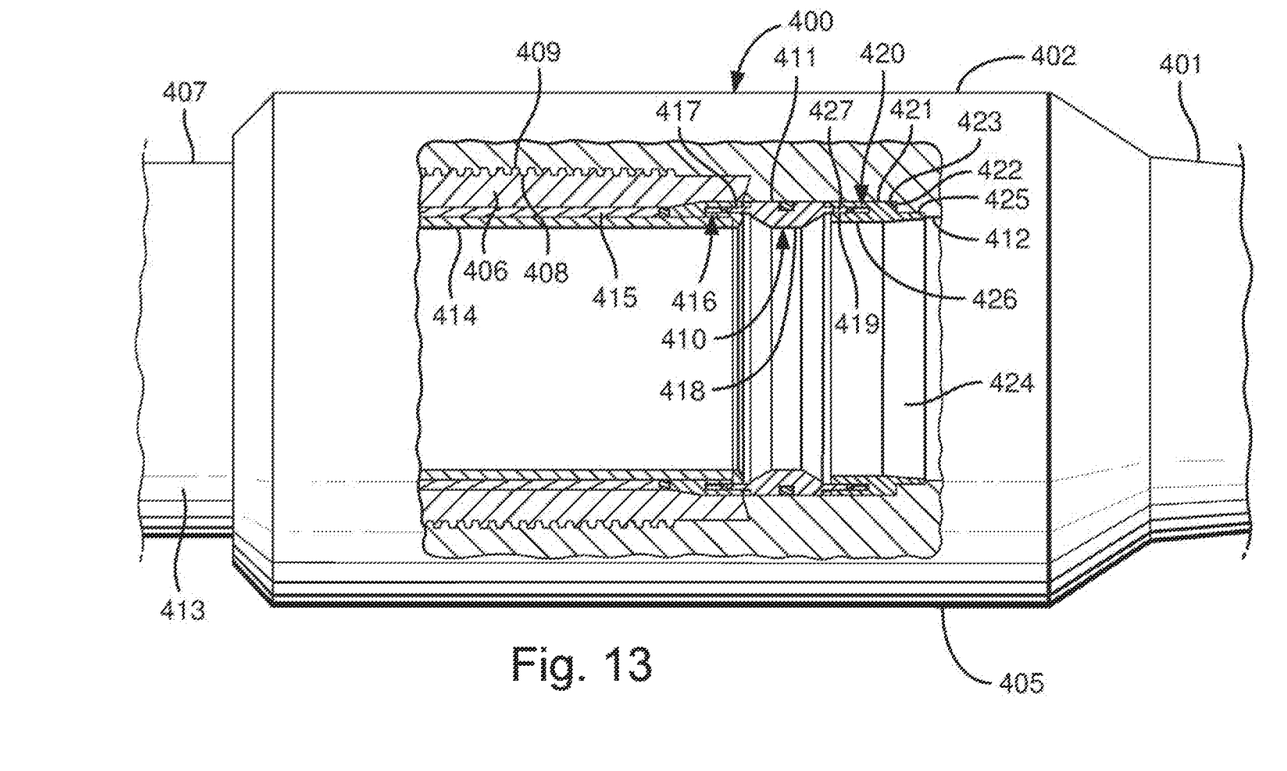
FIG. 13 is a side part sectional view of an accessory connection in accordance with the present disclosure, the accessory connection comprising an accessory box a lined pipe and a protective ring in accordance with the present disclosure.

Referring to FIG. 13, there is shown an accessory box assembly, generally identified by reference numeral 400 and is provided with a "premium" connection. The accessory box assembly comprises a tube 401 which may be integral with a downhole tool, perforate casing, chromium steel casing or other casing or the like, the tube 401 integral with an accessory box 402. The accessory box 402 has an external diameter substantially equal to the outside diameter of an equivalent coupling, such as coupling 217 and thus defining an upset 405 in the tube 401. A pin end 406 of a lined joint of casing 407, which may be identical to joint of casing 209, has an external threaded portion 408 threaded into a corresponding internal threaded portion 409 of the accessory box 402. A protective ring 410 is arranged in a cylindrical recess 411 in an inner surface 412 of the accessory box 402. The inner surface 412 of the accessory box 402 is coincident with the internal diameter of the tube 401. The lined joint of casing 407 comprises a mild steel body 413 lined with a liner 414, which liner is cemented to the mild steel body 413 with a cement based mortar 415. An end flange 416 is provided at the end of the pin end 406 of the joint of casing 407. The end flange 416 may be identical to the end flange 207. An accessory box end flange 420 is provided in a cylindrical recess 421 in the inner surface 412 of the accessory box 402. The accessory box end flange 412 is provide with a groove 419 in one end. A shoulder 422 defines the end of the cylindrical recess 421 to which an opposing end face 423 of the end flange 420 abuts. A lap flange 424 is located in a shallow cylindrical recess 425. The lap flange 424 may be coincident with the inner surface 412 of the accessory box or, as shown, may stand slightly proud. The lap flange 424 may be frusto-conical rising from the internal surface 412 of the accessory box 401 to a level coincident with the internal diameter of the liner 414 of the lined casing 407.

It should be noted that the internal diameter of the accessory box 401 is generally equal to and coincident with the internal diameter of the mild steel body 413 of the casing before being lined with liner 414.

The accessory box end flange 420 may also comprise a plane cylindrical inner surface 426 coincident with the internal diameter of the liner 414 of the lined casing 407.

The protective ring 410 is identical to the protective ring 201. Tongues 417 and 427 extend from body 418. Tongue 417 is located in groove 416 and tongue 427 is located in the groove 419 of the accessory box end flange 420.

Figure 14:
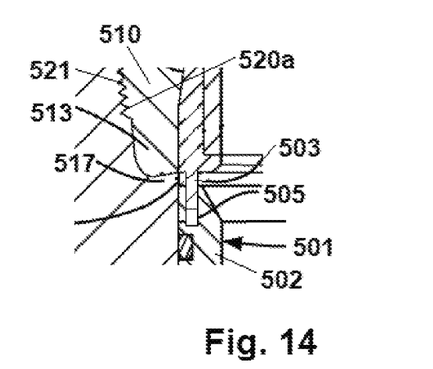
FIG. 14 is a side cross-sectional view of part of a coupling assembly in accordance with the present disclosure.

FIG. 14 shows part of a coupling assembly 500, similar to the coupling assembly 200 but having the groove 205 in the protective ring 201 and the tongue 203 in pin end 213. The coupling assembly 500 comprises a coupling 517, a protective ring 501 and two tubulars 510. The coupling 517 has a generally cylindrical shape with a channel therethrough. The coupling 517 also has at least one internal thread 521 and two coupling ends. A pin end 513 of one of the two tubulars 510 includes an external thread 520a for threaded mating with the internal thread 521 so that the coupling assembly 501 provides a connection between the two tubulars 510. The protective ring 501 includes a ring body 502 for positioning adjacent an interior wall of the coupling 517 between the two coupling ends. The ring body 502 is generally cylindrical and has a ring channel therethrough. The protective ring 502 comprises a cylindrical groove 505 having a length, a constant diameter along the length and concentric with the coupling 517. An end of one of the two tubulars 510 has a cylindrical tongue 503 having a length, a constant diameter along the length and concentric with the coupling 517. The cylindrical tongue 503 is disposed into the cylindrical groove 505 and slideable in the cylindrical groove 505 to allow the protective ring 501 to move relative to the pin end 513.

The invention claimed is:

1. A coupling assembly comprising:
   a coupling;
   a protective ring; and
   a first tubular and a second tubular;
   wherein the coupling comprises a generally cylindrical shape with a channel therethrough, the coupling having at least one internal thread and two coupling ends;
   wherein a pin end of at least the first tubular includes an external thread for threaded mating with the internal thread so that the coupling assembly provides a connection between said first and second tubulars;
   wherein the protective ring includes a ring body for positioning adjacent an interior wall of said coupling between the two coupling ends thereof, said ring body being generally cylindrical and having a ring channel therethrough;
   wherein said protective ring comprises a tongue and an end of at least the first tubular includes a groove, the tongue disposed into the groove and slideable in the groove to allow the protective ring to move relative to the pin end after the connection has been made.

2. The coupling assembly of claim 1, wherein said groove is a cylindrical groove concentric with said coupling.

3. The coupling assembly of claim 1, wherein said tongue is a cylindrical tongue concentric with said coupling.

4. The coupling assembly of claim 1, wherein the second tubular also has an external thread and a further groove, and the coupling assembly further comprising a further tongue on an opposing side of said ring body, the further tongue disposed into the further groove and slideable in the further groove to allow the protective ring to move relative to the pin end after the connection has been made.

5. The coupling assembly of claim 4, wherein the groove is arranged in a ring flange in said pin end of the first tubular.

6. The coupling assembly of claim 1, wherein the first and second tubulars are lined with a liner.

7. The coupling assembly of claim 1, wherein an annulus is provided between at least part of said protective ring and said coupling.

8. The coupling assembly of claim 7, wherein a gap is provided between the tongue and the groove to allow fluid to pass therethrough.

9. The coupling assembly of claim 7, wherein said ring body comprises at least one shoulder to provide a piston surface in said annulus.

10. The coupling assembly of claim 9, wherein said ring body comprises at least a further shoulder to provide a further piston surface in said annulus, said further shoulder opposing said at least one shoulder.

11. The coupling assembly of claim 7, wherein said ring body has an outer wall and a recess therein receiving a ring barrier.

12. The coupling assembly of claim 1, wherein said tongue has a tip with a corrosion barrier thereon.

13. The coupling assembly of claim 1, wherein the second tubular is integral with said coupling.

14. The coupling assembly of claim 1 wherein the ring body and the are for receiving the groove of the end of the first tubular.

15. A coupling assembly comprising:
   a coupling;
   a protective ring; and
   two tubulars;
   wherein the coupling comprises a generally cylindrical shape with a channel therethrough, the coupling having at least one internal thread and two coupling ends;
   wherein a pin end of at least one of the two tubulars includes an external thread for threaded mating with the internal thread so that the coupling assembly provides a connection between the two tubulars;
   wherein the protective ring includes a ring body for positioning adjacent an interior wall of the coupling between the two coupling ends thereof, the ring body being generally cylindrical and having a ring channel therethrough;
   wherein the protective ring comprises a cylindrical tongue having a length with a constant thickness which is concentric with the coupling and an end of at least one of the two tubulars includes a cylindrical groove, the cylindrical tongue disposed into the cylindrical groove and slideable in the cylindrical groove to allow the protective ring to move relative to the pin end.

16. A coupling assembly comprising:
a coupling;
a protective ring; and
two tubulars;
   wherein the coupling comprises a generally cylindrical shape with a channel therethrough, the coupling having at least one internal thread and two coupling ends;
   wherein a pin end of at least one of the two tubulars includes an external thread for threaded mating with the internal thread so that the coupling assembly provides a connection between the two tubulars;
   wherein the protective ring includes a ring body for positioning adjacent an interior wall of the coupling between the two coupling ends thereof, the ring body being generally cylindrical and having a ring channel therethrough;
   wherein the protective ring comprises a cylindrical groove concentric with the coupling and an end of one of the two tubulars having a cylindrical tongue having a length with a constant thickness which is concentric with the coupling, the cylindrical tongue disposed into the cylindrical groove and slideable in the cylindrical groove to allow the protective ring to move relative to the pin end.

17. A coupling assembly comprising:
a coupling;
a protective ring; and
a first tubular and a second tubular having substantially coincident bores for conveying a fluid;
   wherein the coupling comprises a generally cylindrical shape with a channel therethrough, the coupling having at least one internal thread and two coupling ends;
   wherein a pin end of at least the first tubular includes an external thread for threaded mating with the internal thread so that the coupling assembly provides a connection between the two tubulars;
   wherein the protective ring includes a ring body for positioning adjacent an interior wall of the coupling between the two coupling ends thereof, the ring body being generally cylindrical and having a ring channel therethrough;
   wherein the protective ring comprises a cylindrical tongue and an end of at least the first tubular has a cylindrical groove concentric with the coupling, the cylindrical tongue disposed into the cylindrical groove and slideable in the cylindrical groove to allow the protective ring to move longitudinally relative to the pin end;
   an annulus provided between at least part of the protective ring and the coupling; and
   a gap provided between the cylindrical tongue and the cylindrical groove to allow fluid to pass therethrough between the bores and the annulus after the connection has been made.

18. The coupling assembly of claim 17, wherein the cylindrical tongue is located on a side of the ring body and the second tubular also having an external thread and further comprising a further cylindrical tongue concentric with the coupling on an opposing side of the ring body and a further cylindrical groove of constant diameter concentric with the coupling in the second tubular.

19. A coupling assembly comprising:
a coupling;
a protective ring; and
two tubulars;
   wherein the coupling comprises a generally cylindrical shape with a channel therethrough, the coupling having at least one internal thread and two coupling ends;
   wherein a pin end of at least one of the two tubulars includes an external thread for threaded mating with the internal thread so that the coupling assembly provides a connection between the two tubulars;
   wherein the protective ring includes a ring body for positioning adjacent an interior wall of the coupling between the two coupling ends thereof, the ring body being generally cylindrical and having a ring channel therethrough;
   wherein the protective ring comprises a groove concentric with the coupling and an end of one of the two tubulars having a tongue concentric with the coupling, the tongue disposed into the groove and slideable in the groove to allow the protective ring to move relative to the pin end after the connection has been made.

\* \* \* \* \*